United States Patent
Kennedy, Jr. et al.

(10) Patent No.: US 7,911,384 B2
(45) Date of Patent: Mar. 22, 2011

(54) SYSTEM AND METHOD FOR ENHANCING THE ACCURACY OF A LOCATION ESTIMATE

(75) Inventors: Joseph P. Kennedy, Jr., Great Falls, VA (US); John P. Carlson, Dulles, VA (US); Thomas B. Gravely, Herndon, VA (US); Martin Alles, Vienna, VA (US)

(73) Assignee: Andrew, LLC, Hickory, NC (US)

( * ) Notice: Subject to any disclaimer, the term of this patent is extended or adjusted under 35 U.S.C. 154(b) by 144 days.

(21) Appl. No.: 12/122,942

(22) Filed: May 19, 2008

(65) Prior Publication Data

US 2008/0238777 A1 Oct. 2, 2008

Related U.S. Application Data

(63) Continuation of application No. 10/531,044, filed on Oct. 19, 2005, now Pat. No. 7,429,951.

(51) Int. Cl.
*G01S 3/02* (2006.01)
(52) U.S. Cl. ........................ 342/451; 342/465
(58) Field of Classification Search ............ 342/451, 342/457, 463, 465; 455/456.1, 456.6
See application file for complete search history.

(56) References Cited

U.S. PATENT DOCUMENTS

| | | | |
|---|---|---|---|
| 3,975,731 A * | 8/1976 | Latham et al. | 342/48 |
| 4,144,571 A * | 3/1979 | Webber | 701/217 |
| 4,520,445 A | 5/1985 | Keearns | |
| 4,783,744 A | 11/1988 | Yueh | |
| 4,954,837 A | 9/1990 | Baird et al. | |
| 6,952,158 B2 | 10/2005 | Kennedy, Jr. | |
| 2003/0190919 A1 | 10/2003 | Niemenmaa | |
| 2004/0043775 A1 | 3/2004 | Kennedy et al. | |

* cited by examiner

*Primary Examiner* — Dao L Phan
(74) *Attorney, Agent, or Firm* — Duane Morris, LLP

(57) ABSTRACT

A method for enabling a system to enhance the accuracy of a location estimate modifies weights in a weight matrix associated with receiver station measurements in parallel with successive refinements of the location estimate. In a typical location estimation scenario, several receiving stations simultaneously derive measurements of a signal from the emitter. Any one of these measurements is in general some function of the emitter location and the receiving station location. The aggregate of these measurements is often in excess of the minimum number of measurements required to provide an estimate of the emitter location. Where such an excess exists, the method proceeds by modifying the weights associated with the measurements in parallel with successive refinements of the location estimate. The method can be implemented over various cellular protocols with a consistent and significant enhancement in the accuracy of location estimates.

7 Claims, 3 Drawing Sheets

SYSTEM AND METHOD FOR ENHANCING THE ACCURACY OF A LOCATION ESTIMATE

CROSS REFERENCES

The present application is a continuation of and is co-pending with non-provisional application entitled, "System and Method for Enhancing the Accuracy of a Location Estimate," application Ser. No. 10/531,044, filed Oct. 19, 2005, which claims the priority benefit of International Application Number PCT/US2003/032584 and claims priority benefit of provisional application entitled "Geolocation of Mobile Appliances", Appl. Ser. No. 60/418,342 and filed on Oct. 16, 2002, the entirety of which is hereby incorporated herein by reference.

The present application is related to and concurrently filed with applications titled "A NETWORK OVERLAY GEO-LOCATION SYSTEM WITH SMART ANTENNAS AND METHOD OF OPERATION" Ser. No. 10/531,040, "WIRELESS COMMUNICATION NETWORK MEASUREMENT DATA COLLECTION USING INFRASTRUCTURE OVERLAY-BASED HANDSET LOCATION SYSTEMS" Ser. No. 10/531,042, "NETWORK OVERLAY LOCATION SYSTEM AND METHOD FOR AIR INTERFACE WITH FREQUENCY HOPPING" Ser. No. 10/531,041, "A SYSTEM AND METHOD FOR ESTIMATING THE MULTI-PATH DELAYS IN A SIGNAL USING A SPATIALLY BLIND ANTENNA ARRAY, Ser. No. 10/531,039, and "SYSTEM AND METHOD FOR OPERATING A NETWORK OVERLAY GEO-LOCATION SYSTEM WITH REPEATERS" Ser. No. 10/531,038, each filed Oct. 16, 2003, the entirety of each of these applications is incorporated herein by reference.

BACKGROUND

In a typical location estimation scenario, several receiving stations simultaneously derive measurements on the emitter signal, the emitter being a wireless transmitter, a mobile appliance such as a mobile phone, Personal Digital Assistant ("PDA"), or personal computer with wireless capability. Ideally, any one of these measurements is a function only of the emitter location $\vec{P}$, the receiving station locations $\vec{S}_j$ (where the subscript j denotes the station), and the antenna configurations at the receiving stations. A given receiving station may attempt to derive the bearing or Angle of Arrival ("AOA") at which the emitter is located. A different receiving station may attempt to derive the Time Of Arrival ("TOA") of the emitter's signal. Some receiving station pairs may attempt to derive the Time Difference Of Arrival ("TDOA") of the emitter signal between the station pair. Other receiving station pairs may attempt to compute the Frequency Difference Of Arrival ("FDOA") of the emitter signal between the station pair. The form of the measurements is not restricted to the above; certain receiving stations may derive a multiplicity of the measurements indicated or other more exotic measurements.

Most prior art location estimating systems have more receiving stations in place than minimally required. For example, if all receiving stations were to use TOAs to determine the emitter position, three stations would suffice in the ideal case. For a perfect estimate in this scenario, the three TOAs will be exactly correct (perfect) measurements. For receiving station using AOA, two stations would suffice in the ideal case. Where the number of receiving stations used in the estimate is above the ideal number, the estimate becomes an overdetermined solution. The fact that such perfect measurements are never available in practice necessitates the use of an excess of receiving stations and a resulting excess of measurements and an overdetermined solution. Given the excess measurements, a location estimate is derived to best fit the measurements.

In a mixed mode system, a combination of TOAs, TDOAs, AOAs, FDOAs and other measurements are combined to estimate the emitter position. Whether mixed mode or not, the same principle of using (or attempting to use) an excess of receiving stations is applied to generate a more reliable estimate of the emitter location.

In most prior art systems, the mathematical approach taken to derive a location from such an excess of measurements assumes that each of the measurements is the perfect measurement corrupted with Guassian noise with some known statistics. A more detailed explanation of this approach can be found in M. Wax, "Position location from sensors with position uncertainty", IEEE Trans. Aero., Elect. Syst. AES-19, no. 2 (September 1983), 658-662; D. J. Torrieri. "Statistical Theory of Passive Location Systems", IEEE Trans. Aerosp. Electron. Syst. AES-20, no. 2 (March 1984), 183-198; Y. T. Chan and K. C. Ho, "A simple and efficient estimator for hyperbolic location", IEEE Trans. Signal Proc. 42, no. 8 (August 1994), 1905-1915; W. H. Foy. "Position location solutions by Taylor series estimation", IEEE trans Aerosp. Electron. System AES-12, no. 2 (March 1976), 187-194; R. G. Stansfield, "Statistical theory of DF fixing", Journ. IEE 94, part IIIa (October 1947), 762-770; the entirety of each is herein incorporated by reference. This technique has a long and established history and serves as the bedrock of location estimation.

In actual systems, modeling the receiver station measurement as a perfect signal corrupted by noise is accurate only in a small minority of cases. The reason for this is that measurements (of any of the types indicated earlier) typically have biases which are rarely (if ever) reflected in the noise statistics. This measurement bias may stem from a variety of factors. One source of bias is instrumentation error. Another source of bias is signal multipath where a delayed signal, a reflection of the original signal, masquerades as the desired signal.

In determining a location estimate, it is convenient to associate a weight with each measurement. This translates mathematically to either individual weights or a matrix that expresses inter-relationships among the measurements. Given that the biases are unknown and may (in the case of multipath) be functions of the emitter location P, a direct mathematical solution using both the initial weights and unknown biases is impossible: there are an infinite number of solutions. On the other hand, all known solution techniques that ignore the measurement bias result in an estimate that is itself biased. Since the location estimate is derived by a mathematical weighting of each measurement, the weights applied to each measurement have a strong effect on the error in the location estimate. Ideally, the weights applied to good measurements should always be larger than those applied to biased measurements.

Several prior art attempts have been made to address the issue of biased measurements and are described in detail in M. P. Wylie and J. Houtzman, "The non-line of sight problem in mobile location estimation". Proc. IEEE 5th International Conf. on Universal Personal Communications, vol. 2 (October 1996), 827-831; L. Cong and W. Xuang, "Non-Line-of-Sight Error Mitigation in TDOA mobile location" Proc. IEEE Global Telecommunications conference vol. 1 (2001), 680-

684; P. C. Chen, "A non-line-of-sight error mitigation algorithm in location estimating" *Proc. IEEE Conf. on wireless Communications Networking, vol.* 1 (1999), 316-320; and N. J. Thomas, D. G. M. Cruickshank and D. I. Laurenson, "Performance of a TDOA-AOA hybrid mobile location system" *3G Mobile Communication Technologies Conf Proc.* 1 (March 2001), 216-220, all of which are incorporated herein by reference. These references describe approaches that identify the offending measurements and then either eliminate such measurements or model the offending measurements with a distribution different from the traditional approach. Some of these methods additionally require a large number of samples of a particular measurement to create a time-history of the measurement.

A major problem with the prior art techniques is that in practical systems the differentiation between biased and non-biased measurements is never clear-cut. Unlike in purely academic simulations, real life data reveals a continuum ranging from near perfect measurements to measurements with large biases. Experimentation with schemes that attempt to isolate a particular biased measurement have shown that such schemes rarely work. These approaches have great difficulty in identifying the offending measurements when more than one receiving station is in error.

For purposes of this disclosure, dominant measurements are those measurements that most strongly influence the location estimate. When the dominant measurements have a smaller bias than the remaining measurements, the estimate generated by any of the traditional prior art solution techniques mentioned previously is a better estimate than the estimate generated by the measurements with larger bias. That is, the estimate is far from perfect, but is skewed to favor the dominant measurements that within this scenario are described as having a small bias. In practice, and especially when a fair excess of measurements is available, the dominant measurements actually have a smaller bias.

One reason for this is that the set of low bias measurements have a greater degree of self-coherence (less variation or greater mutual agreement) with respect to the mathematics that generates the estimate; hence, they are more likely to dominate the estimate. The skew in the estimate makes the non-dominant measurements have a larger offset with respect to the estimate than the dominant measurements. It is important to note that one or more non-dominant measurements may have a large weight. The self-coherence of several lower weight measurements can thus dominate the location estimate, over-riding the non-dominant high weight measurement that is possibly in error.

The disclosed subject matter capitalizes on this fact to adjust the weights applied to the measurements by the offsets from the hypothetical measurements, with the assumption that at each iteration the location estimate is exact. Thus, the relative weights applied to the dominant measurements are increased with respect to the non-dominant measurements. This process is recursively refined to generate further improvements in the location estimate. The dominant measurements may or may not be a majority of the measurements since only a few high weight measurements may dominate the estimate. Conversely several lower weight measurements may prove dominant in terms of the location estimate, and hence their weights may increase in the next iteration of the process, while the weights applied to the other measurements may decrease.

The method disclosed makes no attempt to determine the offending measurements. The goal, rather, is to improve the location estimate. However, the method can be used to identify the biased measurements subsequent to refining the location estimate.

Therefore, it is an object of the present subject matter to obviate the deficiencies of the prior art and present a novel method and system for recursively refining location estimates by accounting for receiver bias where an overdetermined solution exists.

It is also an object of the present subject matter to present an improved method for refining a geo-location estimate of a wireless transmitter emitting a signal that is received by a predetermined number of sensors that is greater than the minimum number of sensors required to obtain the geo-location estimate. The improvement may include incorporating bias error in the signals received at the sensors and updating the geo-location estimate by recursive analysis of the bias error to thereby refine the geo-location estimate.

It is still an object of the present subject matter to present a method for estimating the geo-location of a wireless transmitter emitting a signal that is received by a plurality of sensors in a geo-location system which includes a geo-location estimation device which provides an overdetermined geo-location solution for the wireless transmitter. The method includes measuring an attribute of the emitted signal to thereby create a sensor signal at the sensor and sending the sensor signal to the geo-location estimation device. The method may also include receiving the plural sensor signals, associating with each sensor signal a separate initial predetermined weight value to thereby provide a plurality of initial estimation signals, determining an initial estimate of the geo-location of the wireless transmitter from the initial estimation signals, and modifying the weight value associated with the dominant sensor signals relative to the weight value associated with the non-dominant sensor signals to thereby provide a plurality of refined estimation signals.

It is another object of the present subject matter to present a novel method for estimating the geo-location of a wireless transmitter emitting a signal that is received by a plurality of sensors in a geo-location system which includes a geo-location estimation device which provides an overdetermined geo-location solution for the wireless transmitter as a function of sensor signals determined from an attribute of the received signal at the plurality of sensors.

It is yet another object of the present subject matter to present a novel system for estimating the geo-location of a wireless transmitter emitting a signal that is received by a plurality of sensors in a geo-location system which further includes a geo-location estimation device which provides an overdetermined geo-location solution for the wireless transmitter as a function of sensor signals determined from an attribute of the received signal at the plurality of sensors.

These and other advantages of the disclosed subject matter over the prior art will be readily apparent to one skilled in the art to which the disclosure pertains from a perusal of the claims, the appended drawings, and the following detailed description of the preferred embodiments.

DETAILED DESCRIPTION

Figure 1:
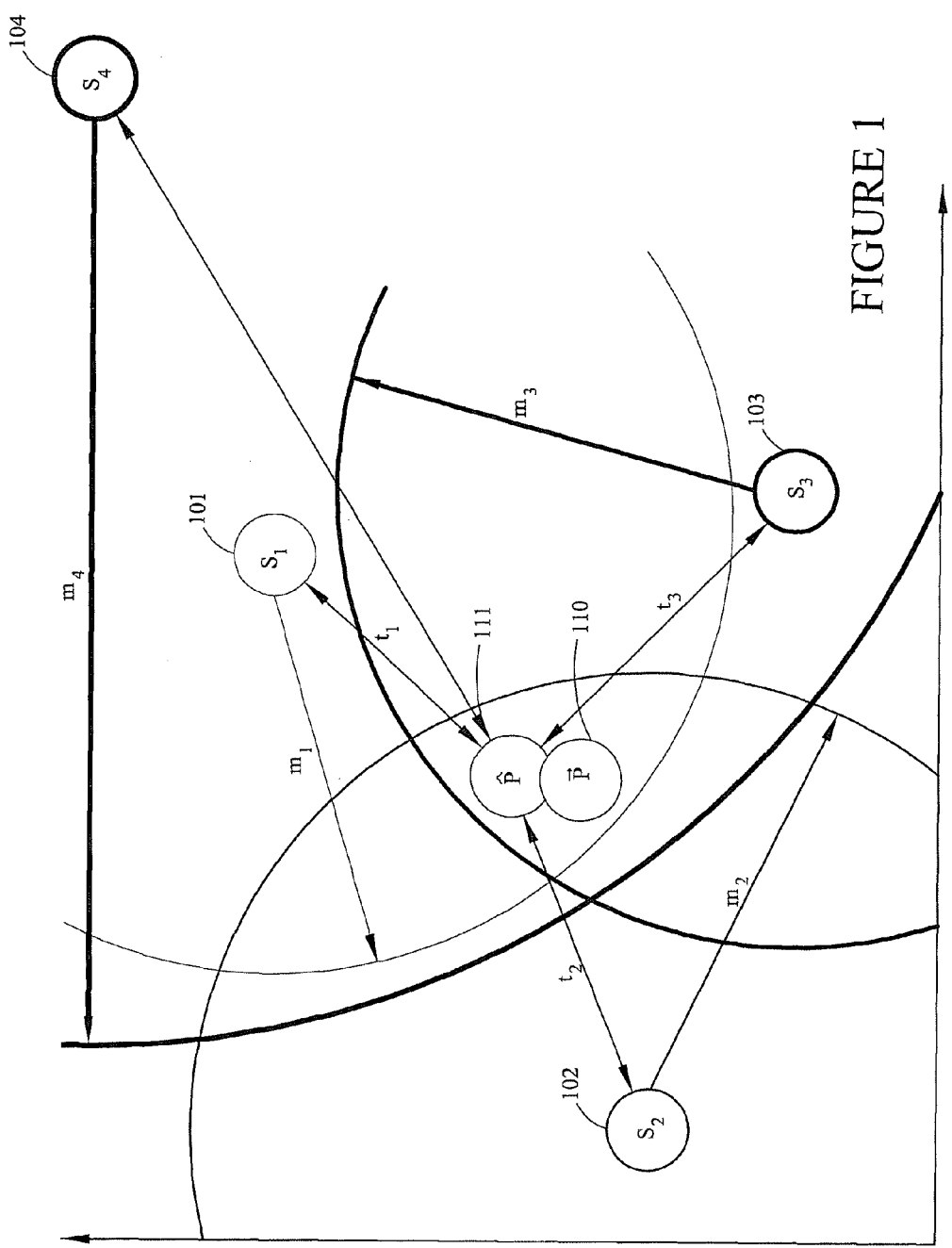
FIG. 1 is an illustration of the elements used to estimate a location in a TOA geolocation system according to an embodiment of the disclosed subject matter.

A mathematical description follows to aid in the description of the current subject matter. The set of measurements from the receiving stations is denoted by $\overline{m}$. These measurements are determined from an attribute of the received signal from the mobile emitter. The receiving stations are typically sensors co-located with base stations in a wireless communication system. The sensors can also be located at repeater stations within the communication system or remotely located. The elements of this column vector $\overline{m}$ are the individual measurements, possibly of several different types, such as TOA, TDOA or AOA, FDOA etc. Each component in the vector is associated with one or more of the receiving stations j, where j denotes (indexes) the station. The self and inter-relationships between the measurements are denoted by the weight matrix $W_k$ where k denotes the iteration number; k is equal to unity at the outset and increases in steps of 1 at each iteration. The matrix formulation is adopted for simplicity since the actual inter-relationships between the measurements could have a more complex form. In the simplest case, the weight matrix $W_k$ is a diagonal matrix expressing the variance associated with individual measurements.

The emitter location estimate is denoted by $\hat{P}_k$, and the receiving station locations are denoted by the column vector $\vec{s}$. The emitter location estimate is given as:

$$\hat{P}_k = f(\vec{s}, \overline{m}, W_k); k=1,2,3 \quad (1)$$

Thus the location estimate is a function of receiving station locations, measurements and weights. The subscript k denotes the iteration number.

Here, $f(\vec{s}, \overline{m}, W_k)$ is the function used to generate a location estimate given the set of measurements and their self and inter-relationships. Depending on the approach taken, $f(\vec{s}, \overline{m}, W_k)$ could be one of many different functions. For example, any one of the functions expressing the location estimate in terms of the sensor positions and the measurements as described in the prior art may be used.

It is clear that the established methods encapsulated by equation (1) need to use a particular weight matrix. In our formulation, the initial weight matrix WI, is a known weight matrix which can be predetermined based on prior knowledge or attributes of the received signals such as the Signal to Noise Ratio (SNR), or even in the most trivial case, an identity matrix. The initial location ($\hat{P}_1$) may be derived from an explicit solution such as in the prior art solutions discussed previously or derived using a specific algorithm satisfactory to the practitioner of this art.

Methods embodying the disclosed subject matter iteratively update or modify the weight matrix in accordance with:

$$W_{k+1} = g(W_k, \vec{s}, \overline{m}, \hat{P}_k); k=1,2,3, \quad (2)$$

where the function $g(W_k, \vec{S}, \overline{m}, \hat{P}_k)$ modifies the weight matrix depending on the agreement between the individual measurements in $\overline{m}$, the receiving station locations $S_j$ and the emitter location estimate at the $k^{th}$ step, $\hat{P}_k$.

Equation (2) summarizes the general approach embodied by the disclosed subject matter. To provide more detail for a particular case, an embodiment of a location system using only TOAs is illustrated.

FIG. 1 is a representation of a geolocation system using TOA, showing the respective elements of equation (1). The receiving stations are designated as 101-104, the actual mobile emitter location $\vec{P}$ is shown as 110 while the estimated mobile emitter location at recursion or iteration k, $\vec{P}_k$, is shown as 111.

Let the sensor locations be denoted by $S_j$, where j=1, 2 . . . N; N denoting the number of sensors; in FIG. 1, N=4.

An embodiment of equation (2) for this case is then:

$$W_{k+1} = W_k + \alpha(\overline{m}-t_k)(\overline{m}-t_k)^T, \quad (3)$$

in which $$t_k = (t_{1,k}, t_{2,k} \ldots t_{N,k})^T = (t_{1,k}, t_{2,k} \ldots t_{4,k})^T$$

where "T" denotes matrix transposition, $$t_{j,k} = |S_j - \hat{P}_k|,$$

and $\alpha$ is a constant matrix which in its simplest form is a constant scalar times an identity matrix and can be theoretically or empirically determined or provided by the geo-location system operator as a fixed setting or in real time.

As a second illustration of the method, consider a scheme that uses only TDOAs. In this case a possible embodiment of equation (2) is $$W_{k+1} = W_k + \alpha(\overline{m}-\tau_k)(\overline{m}-\tau_k)^T \quad (4)$$

where each element in $\overline{m}$ denotes the TDOA measurements with respect to a particular receiving station pair, $$\tau_k = H t_k$$

the (N−1)×(N) matrix H is given by:

$$\begin{bmatrix} 1 & 0 & 0 & \ldots & 0 & -1 \\ 0 & 1 & 0 & \ldots & 0 & -1 \\ \ldots & \ldots & \ldots & \ldots & \ldots & \ldots \\ 0 & 0 & 0 & \ldots & 1 & -1 \end{bmatrix}$$

and the same reference station (station N in this case) is used in the formation of the TDOA measurements.

Figure 2:
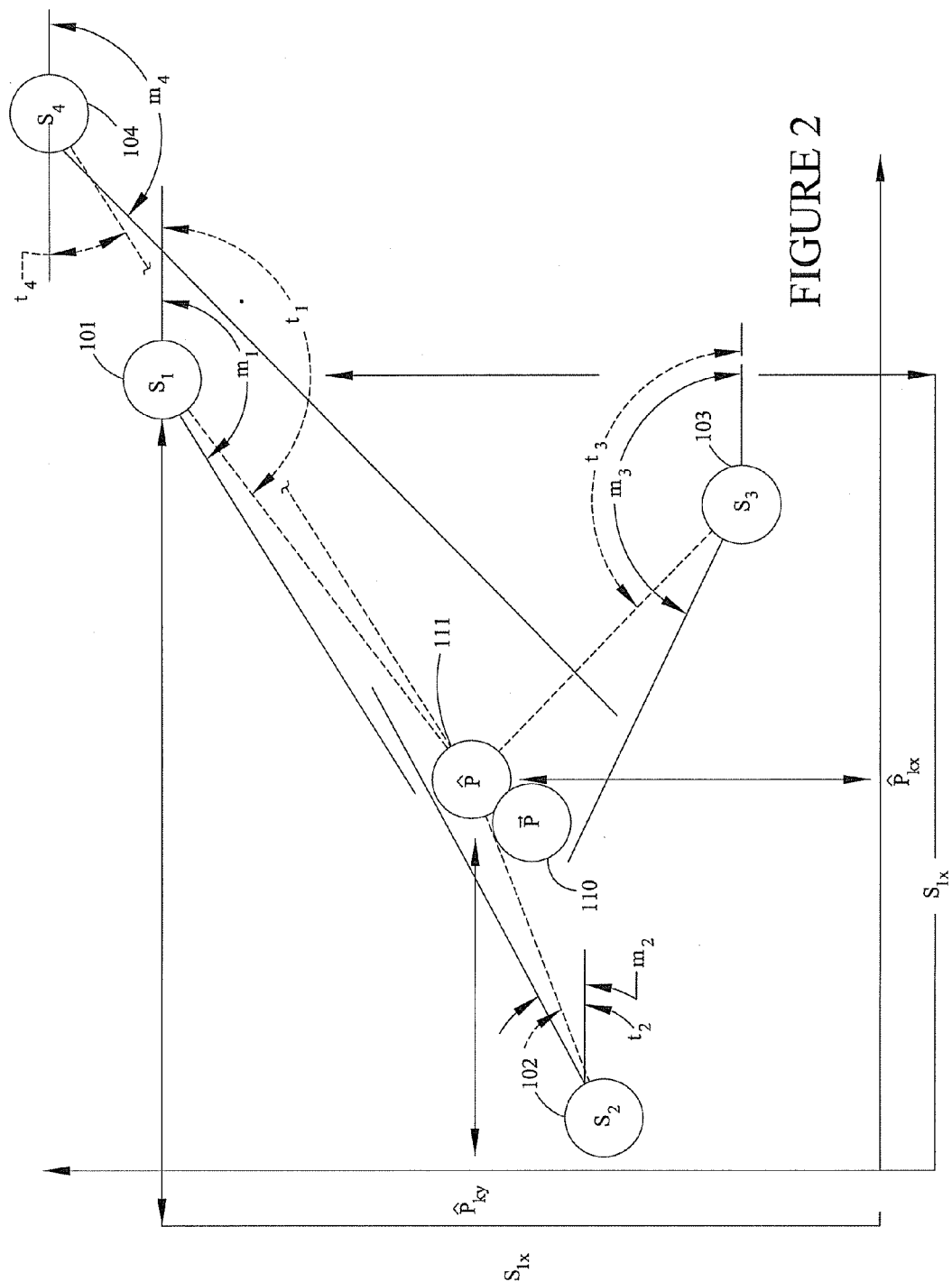
FIG. 2 is an illustration of the elements used to estimate a location in a AOA geolocation system according to an embodiment of the disclosed subject matter.

A third embodiment of equation (2) is shown in FIG. 2, where the location estimation scheme uses AOA. In this case a possible embodiment of equation (2) is $$W_{k+1} = W_k + \alpha(\overline{m}-\gamma_k)(\overline{m}-\gamma_k)^T \quad (5)$$

where each element in $\overline{m}$ denotes the AOA measurement with respect to a particular receiving station, and $$\gamma_{kj} = \tan^{-1}\left(\frac{\hat{P}_{ky} - S_{jy}}{\hat{P}_{kx} - S_{jx}}\right),$$

where subscripts x and y indicate the individual components along the x-axis and y-axis in a 2-dimensional coordinate scheme j indexes the station and k indexes the iteration.

It will be understood by those of skill in the art that although the above-described embodiments describe systems with four sensors, systems with other than four sensors are contemplated by the present subject matter consistent with the description herein.

Figure 3:
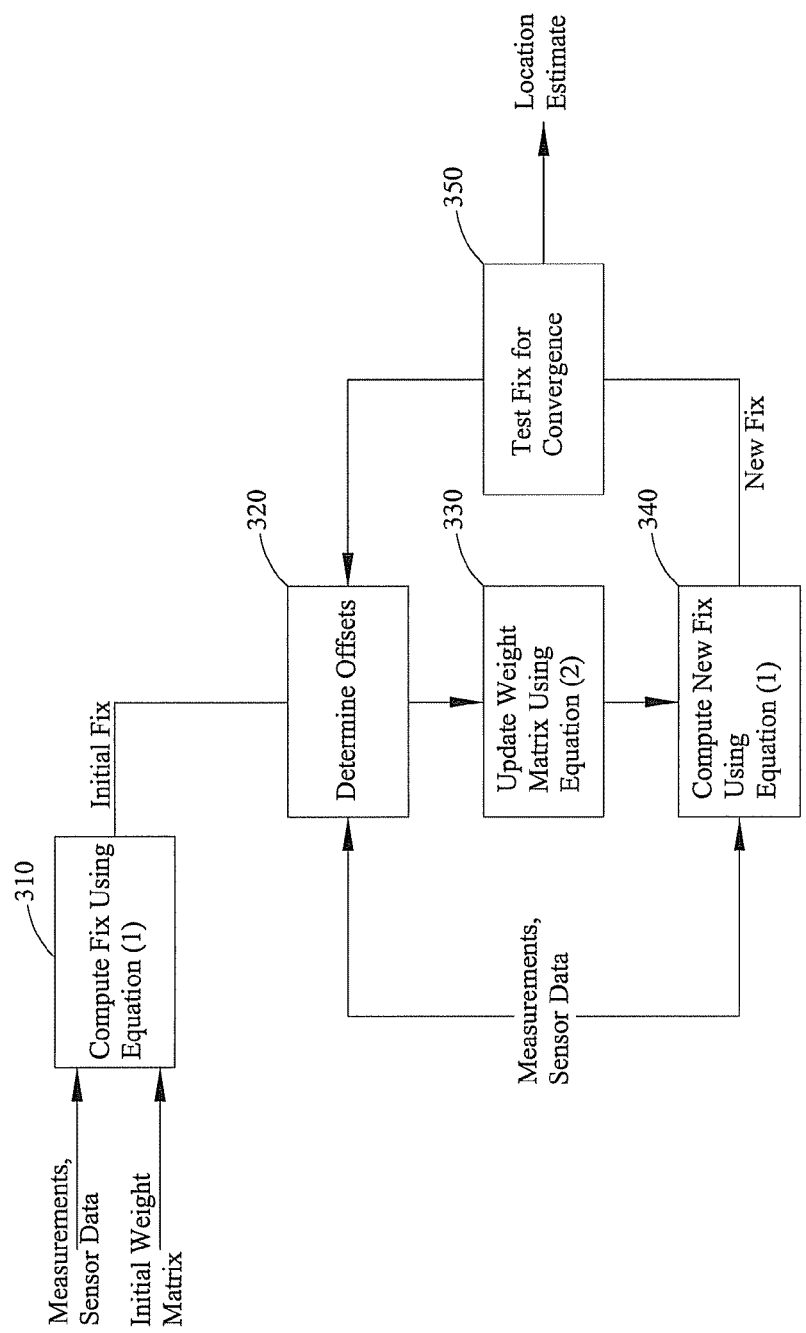
FIG. 3 is a flow chart representing an embodiment of the disclosed subject matter.

FIG. 3 shows a flow chart illustrating a typical implementation of the disclosed subject matter. Measurements or sensor data, where the latter is the precursor of the former along with an initial Weight matrix are supplied to block 310 where any of the prior art methods consistent with equation (1) are used to produce an initial fix. The initial fix or location estimate $\hat{P}_1$ along with the measurements or sensor data are supplied to block 320 where measurement offsets are determined. These offsets are used to update the weight matrix according to equation (2) in block 330. A new location estimate $\hat{P}_k$ is generated with the updated or modified Weight matrix and the measurement m in block 340. The iterations continue until either the Position estimates converge as shown in block 350, or alternatively the iterations cease when some attribute of the Weight matrix converges.

The iteration process can be implemented at the geo-location estimation device or in a subsystem in operational communication with the geo-location device. The geo-location device is generally a processor that performs the mathematical manipulation of the signals from the sensors. The mathematical manipulation can be accomplished with hardware and/or software.

The technique of the current subject matter iteratively modifies the weight matrix $W_k$ as expressed by equations (1) and (2) is functional over varying terrain, different receiving station configurations, and over widely varying cellular protocols.

While preferred embodiments of the present inventive system and method have been described, it is to be understood that the embodiments described are illustrative only and that the scope of the embodiments of the present inventive system and method is to be defined solely by the appended claims when accorded a full range of equivalence, many variations and modifications naturally occurring to those of skill in the art from a perusal hereof.

We claim:

1. A method for geo-locating a wireless transmitter emitting a signal comprising;
    receiving the signal at a predetermined number of sensors, said predetermined number of sensors being greater than the minimum number of sensors required to obtain the geo-location estimate, and signals from the sensors containing information used to estimate the location contain a bias error;
    determining a geo-location estimate of the wireless transmitter based on information from the predetermined number of sensors; and
    updating the geo-location estimate by recursive analysis of the bias error to thereby refine the geo-location estimate.

2. The method of claim 1 wherein the predetermined number of sensors is four.

3. The method of claim 1 wherein the received signals from the sensors are provided at a location estimation device.

4. The method of claim 3 wherein the location estimation device determines the geo-location of the wireless transmitter by a method selected from the group consisting of time of arrival, time difference of arrival, frequency difference of arrival, and angle of arrival.

5. The method of claim 3 wherein the location estimation device determines the geo-location of the wireless transmitter by a plurality of methods selected from the group consisting of time of arrival, time difference of arrival, frequency of arrival, and angle of arrival.

6. The method of claim 1, further comprising determining which one of the sensors has the highest contribution to the bias error and updating the geo-location estimate without information from the one sensor.

7. The method of claim 3, wherein the location estimation device is remote from the wireless transmitter.

* * * * *